United States Patent

[11] 3,618,790

| [72] | Inventor | Joseph T. Carmody<br>100 Balaclava Road, Shepparton, Victoria, Australia |
|---|---|---|
| [21] | Appl. No. | 854,118 |
| [22] | Filed | Aug. 29, 1969 |
| [45] | Patented | Nov. 9, 1971 |

[54] APPARATUS FOR ASSEMBLING AND DEPOSITING LAYERS OF ARTICLES
14 Claims, 8 Drawing Figs.

[52] U.S. Cl.................................................... 214/6 FS, 214/1 BT
[51] Int. Cl. ...................................................... B65g 57/04
[50] Field of Search.......................................... 53/274, 165, 164; 214/6 FS, 6 K, 6 M, 6 N, 6 P, 6 G, 1 B, 1 BT

[56] References Cited
UNITED STATES PATENTS

| 2,524,846 | 10/1950 | Socke et al. .................. | 214/6 FS X |
| 2,619,237 | 11/1952 | Socke........................... | 214/6 N X |
| 2,858,009 | 10/1958 | Bainbridge .................... | 214/6 FS X |
| 2,981,420 | 4/1961 | Johanson...................... | 214/6 K |
| 3,387,718 | 6/1968 | Roth et al. .................... | 214/6 FS X |
| 3,431,698 | 3/1969 | Bathellier..................... | 53/165 X |
| 3,432,045 | 3/1969 | Bauer........................... | 214/6 G X |
| 3,471,036 | 10/1969 | Thomas et al. ............... | 214/6 FS |

Primary Examiner—Gerald M. Forlenza
Assistant Examiner—Robert J. Spar
Attorney—Mellin, Moore & Weissenberger ABSTRACT: An apparatus includes a conveyor for assembling rows of containers or the like against a stop. A transfer carriage, movable back and forth, is included, having a suction head adaptable to grip and release the containers by means of a vacuum applied thereto. A control circuit is included, and is operable by a fluid medium to actuate the transfer device to a gripping position, connect the suction head to a source of vacuum, release the stop, and move the transfer device away from the position of assembly and toward an unloading location. At such unloading location, means become operable to lower the suction head to a container-depositing position. The vacuum at the suction head is then released to allow the suction head to move clear of the deposited containers, and return to its original position.

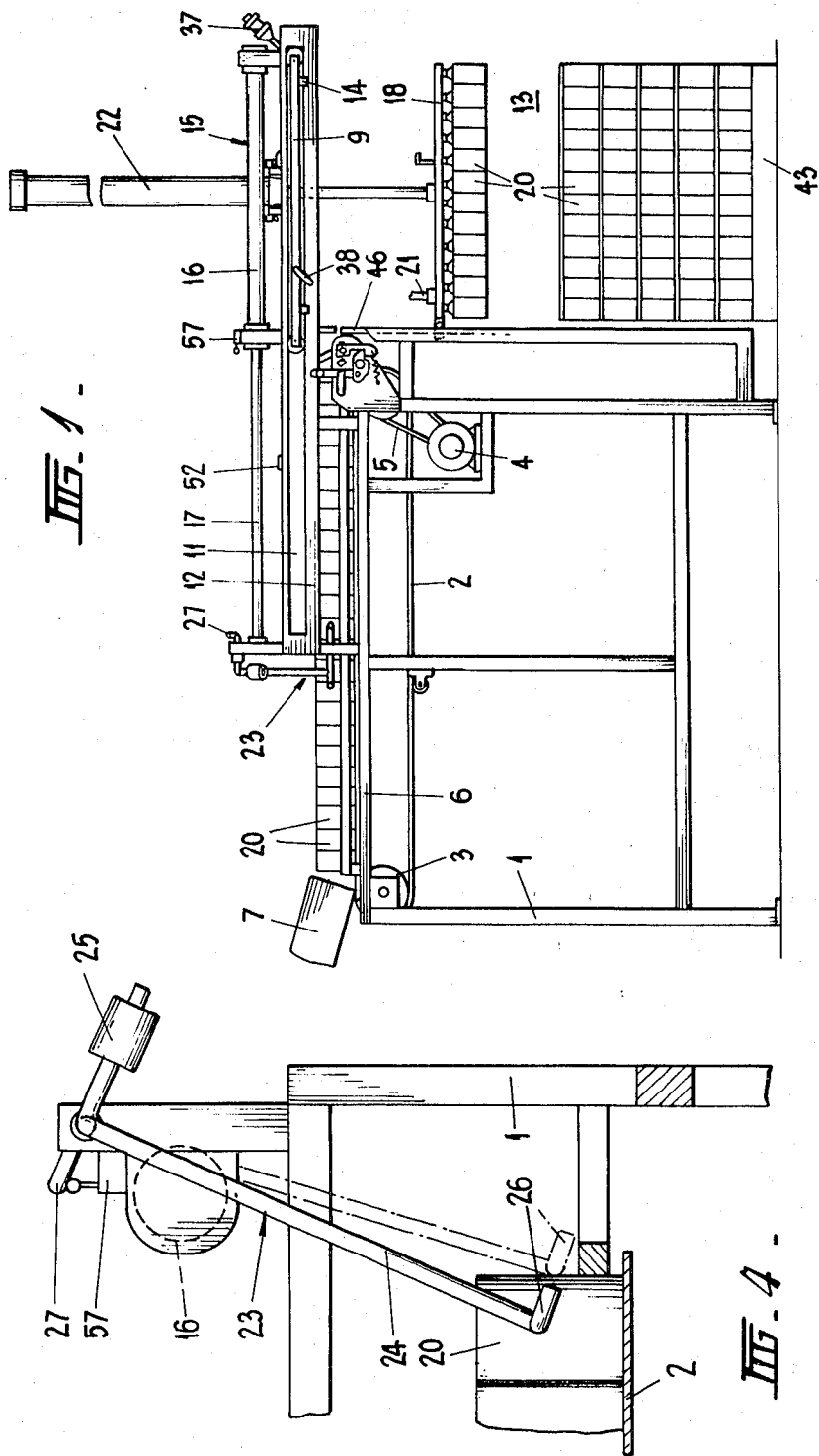

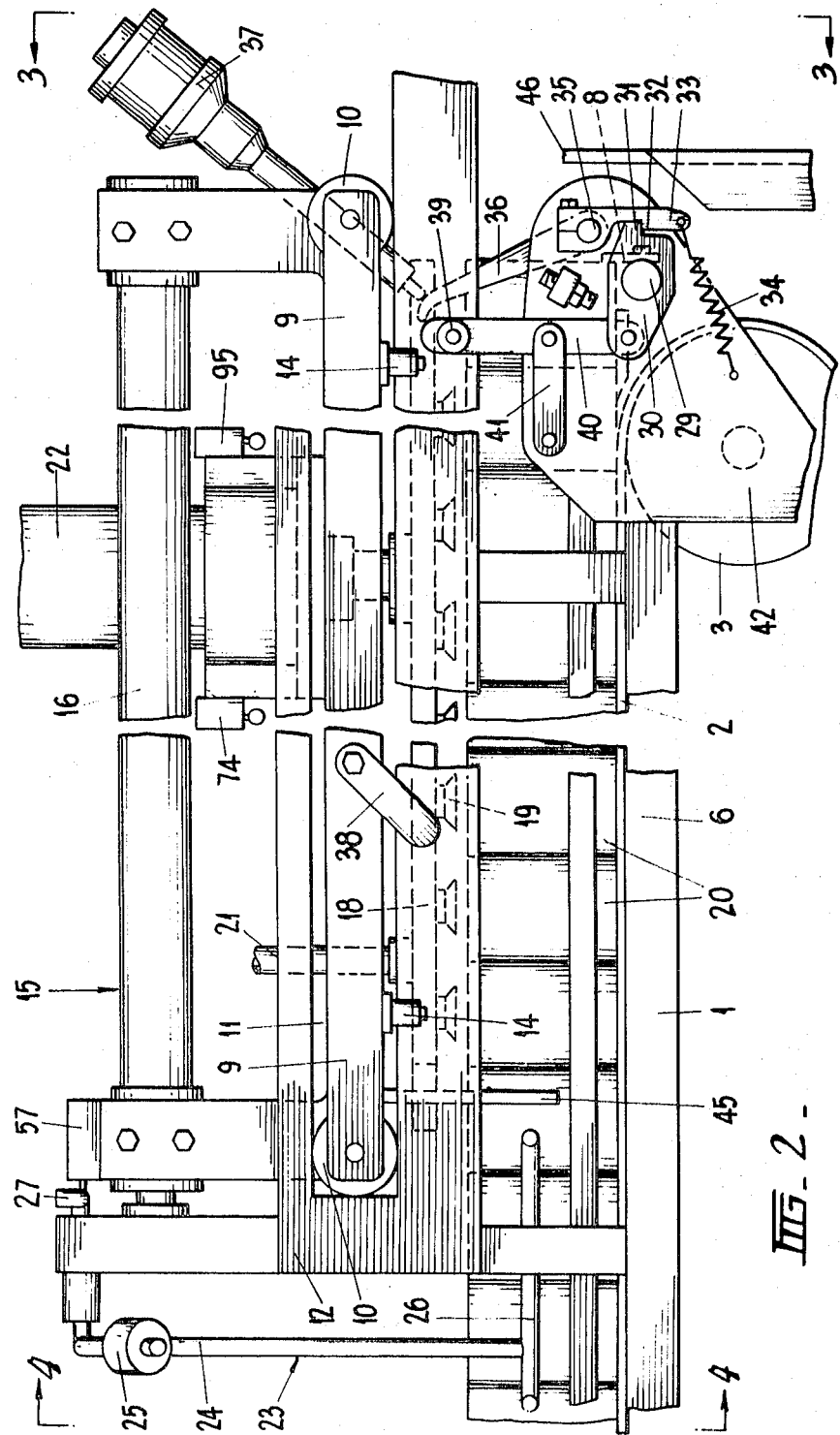

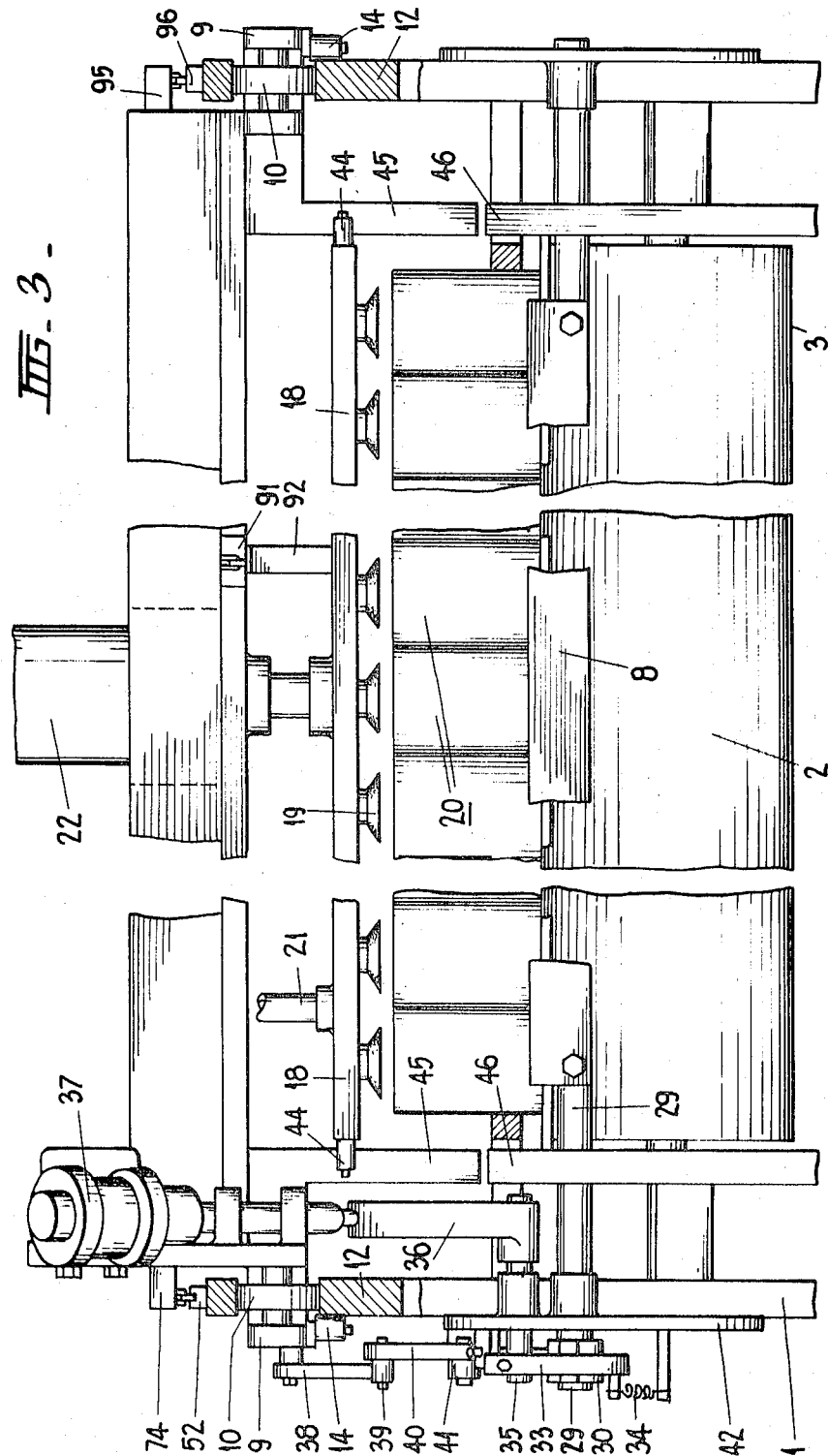

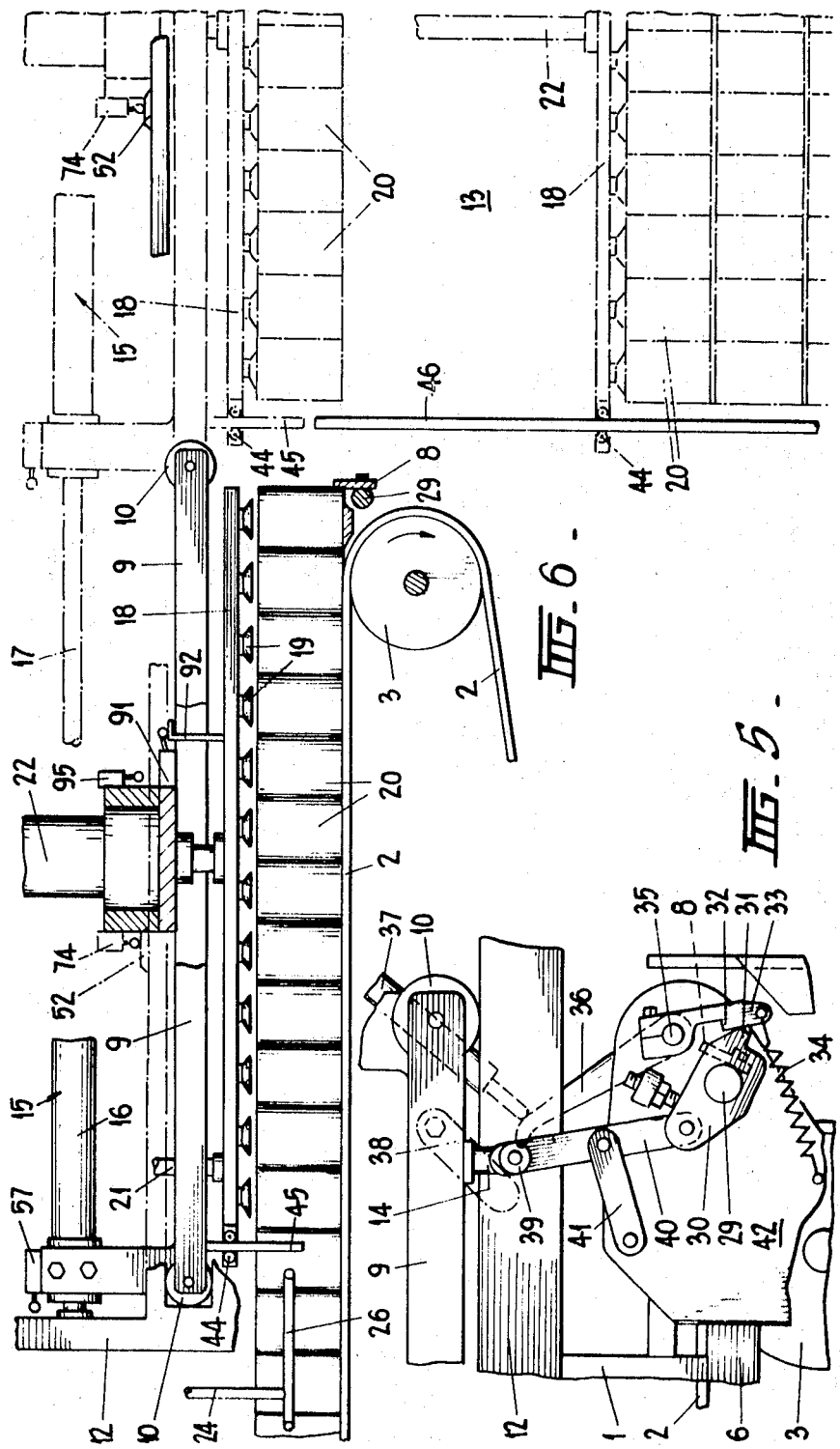

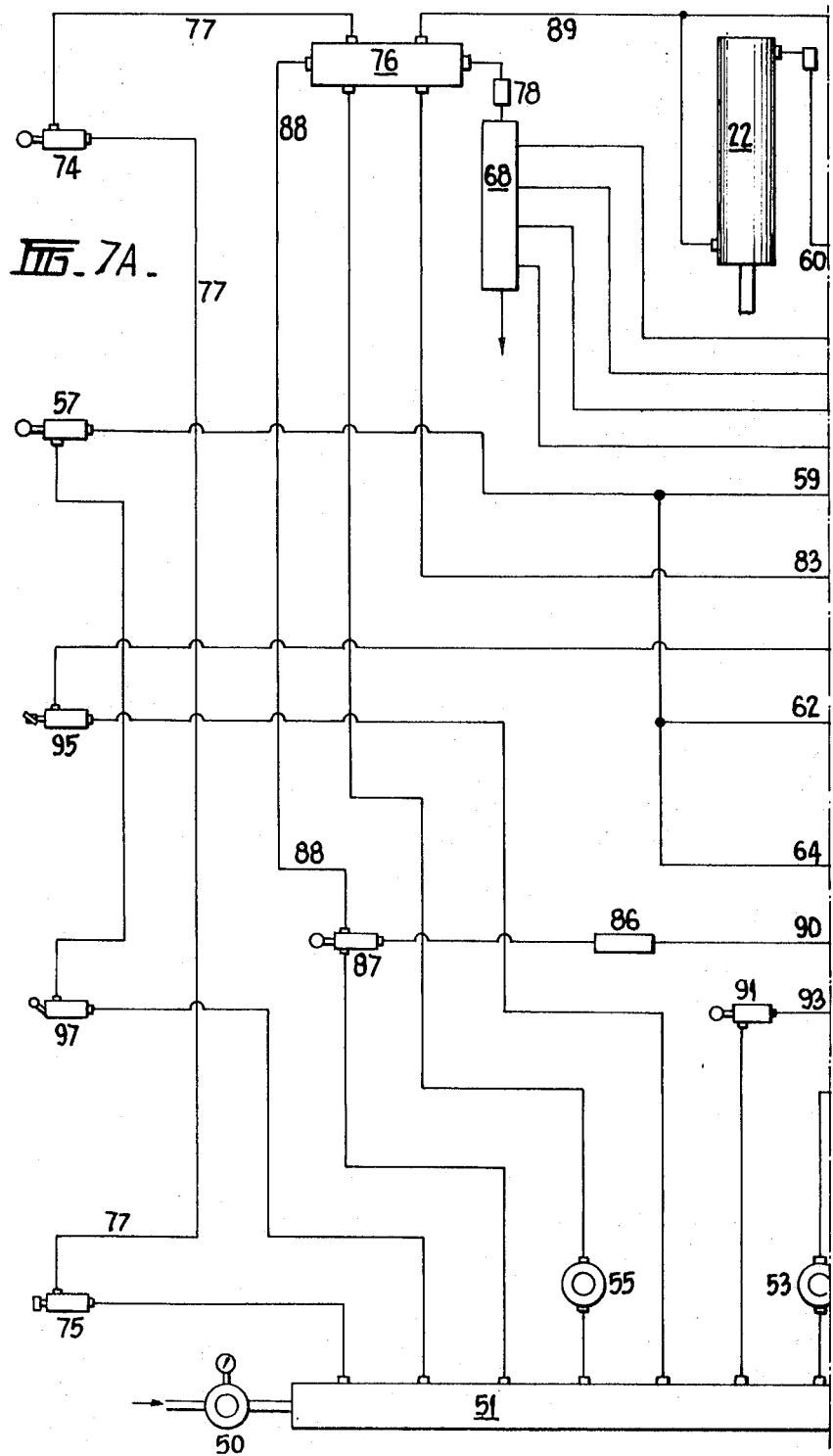

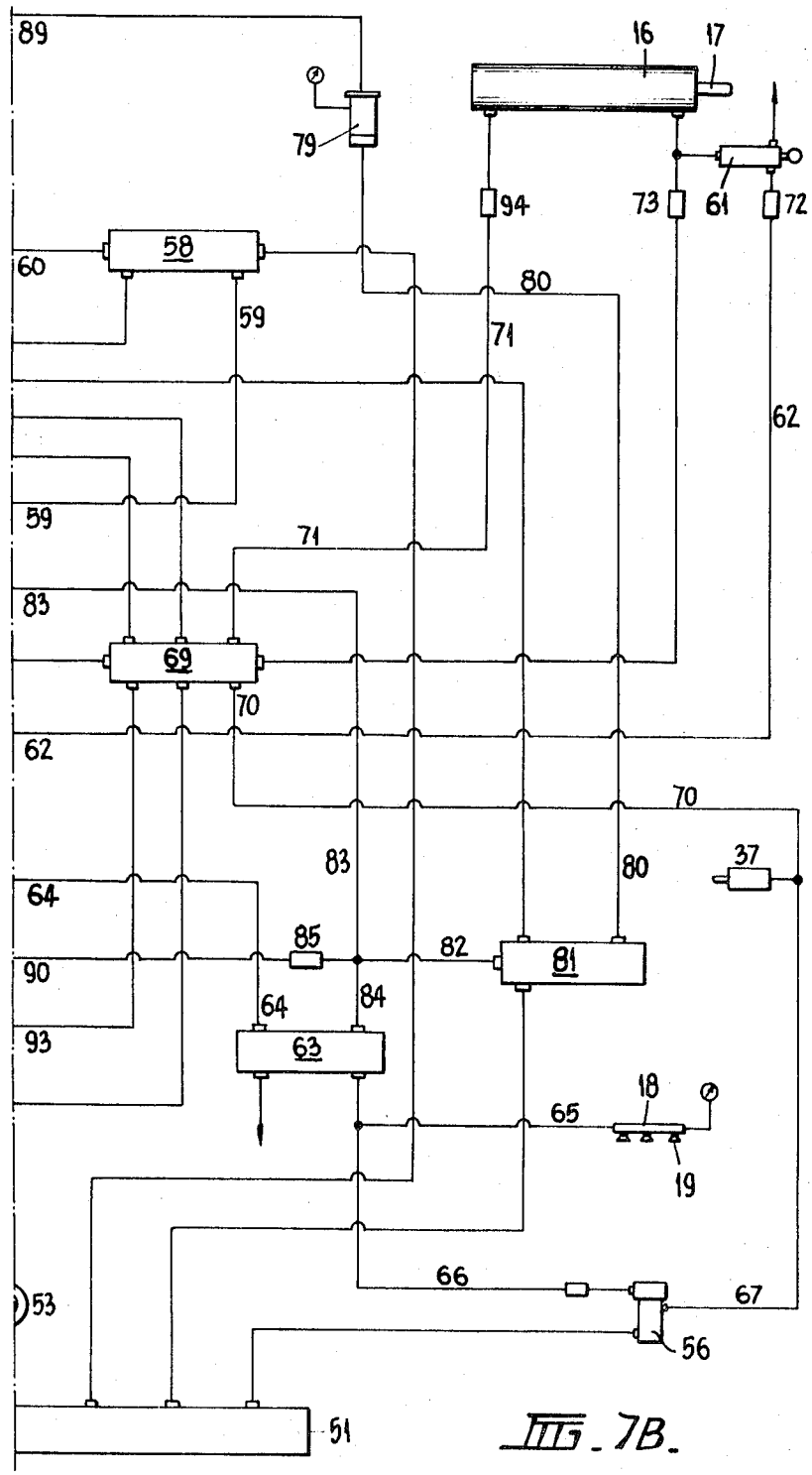
FIG_7B.

APPARATUS FOR ASSEMBLING AND DEPOSITING LAYERS OF ARTICLES

BACKGROUND OF THE INVENTION

This invention relates to an improved apparatus for assembling and depositing layers of articles, such as cans, jars, bottles or other containers, on a pallet or the like, and building same in stack form for subsequent handling by means of a forklift truck or other mechanical means. The apparatus is particularly suitable for palletizing canned goods, such as canned fruit, in a cannery.

It is customary in fruit canneries to store the filled and sealed cans in a cool room or other storage space until such time as the cans are required for labeling and packing into crates and cartons for distribution. For this purpose, it is very desirable to use a pallet system to facilitate handling. The transfer of the cans from the usual conveyor to the pallet is, under existing conditions, slow and laborious and the present invention has for its object the provision of an apparatus which will effectively and efficiently perform this operation.

It is another object of the invention to provide a control circuit in an apparatus having transfer devices for transferring articles assembled at one location to another location wherein a fluid medium is utilized to control the operation of the transfer devices and to control the gripping of the articles during pickup, transfer and deposit at said other location.

Another object of the invention resides in the provision of such a control circuit wherein uniform multiple rows of the articles are transferred from said one location to the other.

SUMMARY OF THE INVENTION

According to the invention, there is provided in an apparatus for assembling containers at one location and transferring the containers to another location, the combination of means for assembling rows of containers at said one location, a transfer carriage device movable between said locations, a suction head on said transfer device operable to grip containers at one of said locations and hold them during transfer to the other location for release at said other location, and a control circuit operable by a fluid medium under pressure for controlling the movement of the transfer device and the gripping and releasing of the containers; said control circuit including valve means operable on the assembly of a predetermined number of rows of containers at said one location to actuate the transfer device to a gripping position, connect the suction head to a source of vacuum, release a container assembly stop member, move the transfer device in a forward movement away from said assembly and gripping location.

A further feature of the invention resides in the combination as above described wherein the said valve means also operate to actuate a lift device connected to the suction head during an accelerated initial movement of the transfer device. Trip means are also provided at the end of the forward movement of the transfer device to actuate the lift device to lower the gripped containers on the transfer device to a depositing position, and means are operable on the engagement of the containers at their depositing position to release the vacuum at the suction head and return the transfer device to its upper position and thence by return movement to the container assembly and gripping location.

BRIEF DESCRIPTION OF THE DRAWINGS

Further features and advantages of the invention will become apparent from the following description of an embodiment of the invention as illustrated in the accompanying drawings, in which:

FIG. 1 is a side elevation of a basic form of the apparatus of the invention with details of the control mechanism omitted for the sake of clarity and showing one assembled layer of cans about to be deposited;

FIG. 2 is a side elevation showing in more detail the movable carriage or transfer device and mechanism associated therewith;

FIG. 3 is a vertical end section taken substantially on line 3—3 of FIG. 2;

FIG. 4 is a vertical end section taken substantially on line 4—4 of FIG. 2;

FIG. 5 is a detail view showing the operation of the mechanism shown in FIG. 2;

FIG. 6 is a longitudinal section showing in broken lines the operation of the apparatus in building stack of layers of cans on the pallet; and FIGS. 7A and 7B illustrate a circuit diagram of a control mechanism of the invention.

DESCRIPTION OF THE PREFERRED EMBODIMENT

As is shown in FIGS. 1 to 6, the apparatus comprises a main frame 1 supporting, at its upper end, an endless broad-belt conveyor 2 supported by end rollers 3 and suitably driven from an electric motor 4 as by means of a power transmission chain 5. The belt conveyor 2 moves across a flat table 6 on the upper end of the frame 1 and receives the cans of fruit from the usual feed conveyor 7.

Arranged at one end of the conveyor 2 is a transverse stop member 8 against which the cans abut and are marshaled. The movement of the conveyor causes the cans to assemble and be marshaled in a layer of regular row formation against the stop member 8 as is shown particularly in FIG. 6. When the apparatus is first started up, it may be necessary to first assemble two or three rows of cans by hand against the stop member 8 to initiate the row-building operation, but after that the operation is automatic, the cans rolling one along the other and marshaling into the row formations against the stop member solely under the movement of the conveyor 2.

Arranged above the conveyor 2 is a horizontally movable carriage 9 having wheels or rollers 10 adapted to move within guide tracks 11 on a superstructure 12 supported from the main frame 1. Said superstructure is arranged over the end portion of the conveyor 2 at which the cans are marshaled into row formation against the stop member 8 and also overhangs a space 13 in which the deposited layers of cans are built into stack arrangement on the pallet.

The horizontal movement of the carriage 9 may be further guided by providing small rollers 14 on the opposite sides of the carriage running against the side walls of the superstructure 12.

The carriage 9 is moved by means of one or more suitable traverse actuators as 15, which are, in this embodiment, pneumatically actuated. Said actuators may take the form of cylinders 16 on the carriage and rods 17 on the superstructure 12 connected to pistons within the cylinders. The actuating fluid, which is preferably compressed air, is admitted to the cylinders on opposite sides of the pistons to move the carriage in opposite directions.

The carriage 9 supports a hollow suction head 18 having a plurality of suction cups 19 arranged to correspond to and register with the marshaled containers such as cans 20 on the conveyor 2. Vacuum is supplied to the suction head 18 and cups 19 as by a hose 21.

The suction head 18 is capable of vertical movement. Such movement is effected by an actuator 22 which is of the cylinder-and-piston type actuated by compressed air.

Arranged at one side of the conveyor 2 to be acted on by the assembled cans 20 is a trip device 23 which may comprise an arm 24 (see FIG. 4) pivoted at its upper end and acted on by a weight 25 to cause its lower end 26 to be extended into the path of the cans being marshaled on the conveyor 2. Said trip device also has a member 27 at its upper end adapted, when the lower end 26 of the arm 24 is moved outwardly by the cans, to actuate a full layer trip poppet valve 57 located on a traverse cylinder 16.

The stop member 8 is controlled by suitable release and resetting mechanism, such as that shown in detail in FIG. 5. The stop member 8 is secured to a transverse shaft 29 which, at one end, supports a plate 30. Said plate has a detend 31 normally engaging a detend 32 on a lever 33. The detents are held engaged by a spring 34 acting on the lever 33 (see FIG. 2). The lever 33 is mounted on a shaft 35 carrying an arm 36 adapted to be actuated by latch cylinder 37 to thus disengage the detents 31 and 32 and release the stop member 8.

To reset the stop member 8, a resetting cam 38 is provided on the carriage 9 and arranged to engage a roller 39 on a lever 40 pivoted to the plate 30. The lever 40 is pivoted to a swinging link 41 pivoted to subframe 42 which also supports the shafts 29 and 35. When the cam 38 strikes the roller 39 on the movement of the carriage, it operates the lever 40 to move the plate 30 in such manner that the stop member 8 is moved upwardly to its can-stopping position and the detents 31 and 32 again engaged to hold the stop member 8 in the aforesaid position.

DESCRIPTION OF CONTROL MECHANISM AND OPERATION OF THE PREFERRED EMBODIMENT

Referring to FIGS. 7A and 7B, air under pressure from a main supply is fed through pressure regulator 50 to a manifold 51 maintaining a pressure of 60 p.s.i. therein. Traverse cylinder 16 is fed from manifold 51 through pressure regulator 53, maintaining a pressure of 15 p.s.i. at the cylinder 16, and main lift cylinder 22 is fed through pressure regulator 55, maintaining a pressure of 45 p.s.i. at cylinder 22. These pressures are adjustably variable according to the application of the apparatus, the types of containers and the desired movement speeds of the various parts. Vacuum diaphragm valve 56 is set to operate at 15 inches Hg in the present embodiment, but can be adjusted to suit various sizes and weights of containers to ensure safe transfer of the particular containers.

In operation of the apparatus the full layer trip poppet valve 57 located on cylinder 16 is actuated by trip device 23 when a full layer of containers has formed. This valve 57 operates three components, as follows:

i. Valve 58 is actuated through line 59 to allow pressure air at 60 p.s.i. from manifold 51 to flow to the top of lift cylinder 22 through line 60. This pressure air drives the piston of cylinder 22 downwards so that the suction cups 19 contact the containers. A pressure of 45 p.s.i. exists under the piston of lift cylinder 22 at all times except during the container deposit cycle (as hereinafter described) and therefore at this stage a pressure differential of 15 p.s.i. exists and this differential is the actual downward driving pressure of the suction head 18 to the container-gripping position.

ii. A fast exhaust time delay valve 61, which opens the exhaust port of traverse cylinder 16 directly to atmosphere for initially assisting in accelerating the carriage and suction head on the forward stroke, is charged through line 62. This acceleration of the carriage operates only for a short period during the forward stroke to produce a gap of 1 to 3 in. between containers held on the suction head and containers following behind into the assembly location. This gap will minimize a malfunction of the apparatus due to "seam locking." By "seam locking" is meant the engagement of the rolled top or bottom seam of a container not held by the suction head over the top or bottom seam respectively of a container in the last row on the suction head, by which the nonengaged container may be lifted and carried along by the gripped or engaged containers.

iii. Valve 63, which is connected to a vacuum pump, is operated through line 64 to introduce a vacuum at the suction cups through line 65. When the suction cups contact the containers a vacuum of 15 inches Hg, in this embodiment, must be produced before the suction head commences its forward travel. The degree of vacuum in the suction head is the same as in the diaphragm housing of valve 56 by reason of connection through line 66. When 15 in. Hg or more of vacuum is reached, the diaphragm of valve 56 will move and lift its associated plunger away from its seat against spring tension, allowing pressure air from the manifold 51 to flow through line 67 to latch cylinder 37 to trip down the container assembly stop bar 8, and at the same time valve 69 will be actuated from line 70.

The piston in traverse cylinder 16 will now move the carriage with the suction head and gripped containers forwardly due to pressure air flowing through line 71 from valve 69 and at the start of this forward travel the full layer trip poppet valve 57 moves away from its trip device 23, exhausting lines 59, 62 and 64 to atmosphere.

The exhausting of line 59 will close valve 58, which in turn exhausts the pressure fluid in line 60, releasing the 60 p.s.i. pressure on top of the piston in lift cylinder 22 and allowing the suction head 18 to rise. The pressure from line 62 and fast exhaust time delay valve 61 will exhaust, and by controlling the rate of exhaust by means of flow regulator 72 the traverse cylinder exhaust port can be closed at the desired time, and by closing this port to atmosphere the air will then flow back through flow regulator 73, which controls the speed of the forward movement of the carriage.

This speed will be such that the break of 1 to 3 in., as previously mentioned, will close up and the assembled containers on the conveyor belt will gently touch the cans on the suction head and move forward onto the container assembly stop bar 8 which has been reset by cam 38, and bar 8 is, at the reset stage, below the bottom of the gripped containers on the suction head, which moves forward to a position above its unloading location.

To lower the suction head and gripped containers to the unloading position on a pallet or the like, or on top of a previously unloaded layer of containers, an unloading position press button interlock poppet valve 74 must sit on and be actuated by cam 52 on structure 12 before pushbutton interlock poppet valve 75 will operate valve 76 via line 77 through the interlock poppet valve 74. Valve 76 will now exhaust air from the underside of the piston in lift cylinder 22 at a controlled rate through flow regulator 78 to exhaust manifold 68.

This controlled rate of exhaust from cylinder 22 will introduce a back pressure of approximately 28 p.s.i. in the cylinder due to the weight of the gripped layer of containers and the suction head; and this back pressure is a desirable setting for a steady downward speed in this embodiment. When the suction head and containers reach the pallet or preceding deposited layer of containers, this exhausting air will continue to escape to atmosphere and drop to 15 p.s.i. in the cylinder 22. At this lower pressure the spool in a layer-sensing valve 79 will move away from its seat and exhaust the pressure from line 80, which is connected to valve 81, allowing air pressure to flow from valve 81 through line 82.

Three separate sequences will again now operate as follows:

a. The pressure of 15 p.s.i. will be held in lift cylinder 22 by neutralizing valve 76 through line 83, and this pressure will be maintained in cylinder 22 until sequence (c). The 15 p.s.i. pressure will balance the weight of the suction head, which assists in placing a layer of containers cleanly on the pallet or a previous layer.

b. Vacuum will be shut off and the suction head exhausted to atmosphere through line 84 by actuating valve 63. As the vacuum is decreased, the suction head will slowly rise off the containers for about one-half inch, leaving the containers cleanly on the pallet or a previous layer. This slow rise of the suction head is due to both the release of vacuum and the 15 p.s.i. neutralizing pressure still in cylinder 22.

c. While both sequences (a) and (b) are occurring, air is bled through flow regulator 85 into time delay volume 86 via line 90. After a short delay of 1–2 seconds, lift cylinder return poppet valve 87 will be actuated and in turn will operate valve 76 through line 88. Air will now flow through line 89 and return the suction head at fast speed to its top seating position under carriage 9. The pressure applied to the cylinder 22 through line 89 will also reseat the layer-sensing valve poppet 79 and thus close off valve 81 through line 80, and this will exhaust lines 82, 83, 84 and 90. As the suction head 18 approaches its top seating position, return traverse poppet valve 91 is tripped by arm 92 on suction head 18, which actuates valve 69 via line 93. Valve 69 will change pressure and exhaust to the opposite ports of traverse cylinder 16, and in doing so returns the carriage. The carriage travel speed is controlled by flow regulator 94, and as the carriage approaches the pickup position over the assembled containers, traverse neutralizing poppet valve 95 is tripped by cam 96 on structure 12 (see FIG. 3), and this positions the spool in valve 69 such that both ends of the traverse cylinder 16 are exhausted to atmosphere, and the carriage now sits in a neutral position. This neutral position or attitude assists in the initial acceleration of the forward stroke of the carriage as above described.

If a full layer of containers is assembled on the conveyor 2, trip device 23 will actuate full layer trip poppet valve 57 and the sequence of operations will be repeated. If a full layer has not yet been assembled, the trip device 23 will operate only when a full layer has been assembled.

Toggle switch poppet valve 97 is provided for isolating the full layer trip poppet valve 57 from main pressure and stop the apparatus from starting its cycle. The flow regulators 73 and 94 on the traverse cylinder 16 control exhausting air only, and thus a back pressure and small pressure differential is set up and the rate of escape of this back pressure controls the traverse speed.

To ensure accurate depositing of the cans onto the pallet 43 and the stack of cans being built up in the space 13, the suction head 18 may be guided in its vertical movement by appropriate guide means. Said means may consist of spaced rollers 44 on one end of the suction head running upon a short vertical rod 45 carried by the carriage 9. Said short rod 45 is arranged to axially align with a vertical guide rod 46 in the space 13 (see FIG. 6) so that the rollers 24 of the suction head roll from the short rod 45 onto the aligned guide rod 46. The downward depositing movement of the suction head 18 is thus accurately guided.

The stack layers of cans built on the pallet 43 in the space 13 can be removed from time to time as required by means of a forklift truck or other means.

I claim:

1. Apparatus for handling articles when assembled in rows on a receiving table comprising a transfer carriage supported for lateral traversing movements from a first assembly location above the table to a second unloading location at one side thereof, a lifting head on the transfer carriage provided with suction means for gripping and holding said articles during traversing movements of the carriage, means for raising and lowering the lifting head an article assembly stop member associated with said table movable from a stop position for retaining articles on the receiving table to release position, and a control circuit operable by a fluid medium under pressure for controlling the vertical and horizontal movement of the transfer carriage and the gripping and releasing of said articles, said control circuit including valve means operable on the assembly of a predetermined number of rows of said articles at said first location to actuate the lifting head and suction means to a gripping position, connect the suction means to a source of vacuum, release the article assembly stop member and move the transfer carriage laterally away from said assembly and gripping location, and means operable when the carriage is in the unloading location to lower the lifting head and release the attached articles, whereby said transfer carriage is initially only moved in a lateral direction away from said assembly and gripping location and then it is moved in both a vertical and a lateral direction to said unloading location.

2. An apparatus according to claim 1 wherein said valve means operate to provide an initial acceleration of the transfer device on its movement away from the assembly location so as to produce a gap between the containers on the lifting head and the containers remaining at the assembly location.

3. An apparatus according to claim 2 wherein the lifting head is connected to the transfer carriage by fluid-actuated lift means, said lift means being operable on movement of said transfer carriage to raise the lifting head and attached articles above the assembly stop member and allow the article assembly stop member to be returned to its operative position.

4. An apparatus according to claim 3 wherein a trip member is located at said unloading location so as to actuate said valve means connected to said lift means to provide controlled lowering of said lifting head to an article depositing position.

5. An apparatus according to claim 4 and including means operable by said lift means at said depositing position to release the vacuum at the suction means on the lifting head and allow the lifting head to move clear of the deposited articles and return it to its upper position.

6. An apparatus according to claim 5 and including a time delay means operable at the depositing position to allow release of the lifting head from the articles before the lift means are actuated to return the lifting head to its upper position.

7. An apparatus according to claim 6 and including valve means operable by a trip device when the lifting head reaches its upper position to return the transfer carriage to the article assembly location in readiness for a repeat cycle of operations.

8. An apparatus according to claim 2 wherein is included at least one double-acting fluid-operated ram for actuating the transfer carriage and wherein means are provided in the circuit to exhaust all fluid from said ram at the article assembly location in order to facilitate the initial acceleration of the transfer carriage.

9. An apparatus according to claim 1 wherein the means for assembling the rows of articles comprises a belt conveyor operable to assemble the articles against stop member.

10. An apparatus according to claim 1 wherein the valve means for releasing the stop member include a member retained in a position to hold the stop member in operative position and a latching device operable by said valve means for actuating said retained member to release the stop member.

11. An apparatus according to claim 10 and including cam means on said transfer carriage for resetting the retained member to return the stop member to its operative position after a predetermined movement of the transfer carriage.

12. An apparatus according to claim 1 and including a frame structure extending from the assembly location to the unloading location, the transfer carriage being movable in guides in said structure.

13. An apparatus according to claim 1 wherein said valve means is operable at the assembly location by a pivoted arm, the lower end of such arm being adapted to be engaged by the articles and the upper end of such arm being adapted to engage and actuate said valve means.

14. Apparatus for handling articles when assembled in rows on a receiving table comprising a transfer carriage supported for lateral traversing movements from a first assembly location above the table to a second unloading location at one side thereof, a lifting head on the transfer carriage provided with suction means for gripping and holding said articles during traversing movements of the carriage, said lifting head being connected to the transfer carriage by fluid-actuated lift means, means for raising and lowering the lifting head when the carriage is in the second unloading position, an article assembly stop member associated with said table movable from a stop position for retaining articles on the receiving table to a release position, nd a control circuit operable by a fluid medium under pressure for controlling the movement of the transfer carriage and the gripping and releasing of said articles, said lift means being operable on movement of said transfer carriage to raise the lifting head and attached articles above the assembly stop member and allow the article assembly stop member to be returned to its operative position, said control circuit including valve means operable on the assembly of a predetermined number of rows of said articles at said first location to actuate the lifting head and suction means to a gripping position, connect the suction means to a source of vacuum, release the article assembly stop member and move the transfer carriage laterally away from said assembly and gripping location, and means operable when the carriage is in the unloading location to lower the lifting head and release the attached articles, wherein said valve means for releasing the stop member includes a member retained in a position to hold the stop member in operative position and a latching device operable by said valve means for actuating said retained member to release the stop member, and said valve means further including cam means on the transfer carriage for resetting the retained member to return the stop member to its operative position after a predetermined movement of the transfer carriage.

* * * * *